United States Patent [19]

Nakayama et al.

[11] Patent Number: 4,482,958
[45] Date of Patent: Nov. 13, 1984

[54] DATA PROCESSING DEVICE FOR COMPUTED TOMOGRAPHY SYSTEM

[75] Inventors: Nobutoshi Nakayama, Nishinasumo; Yukinobu Ito; Eitaro Nishihara, both of Otawara; Kazuhide Iwata; Shigeki Shibayama, both of Yokohama, all of Japan

[73] Assignee: Tokyo Shibaura Denki Kabushiki Kaisha, Kawasaki, Japan

[21] Appl. No.: 320,566

[22] Filed: Nov. 12, 1981

[30] Foreign Application Priority Data

Nov. 17, 1980 [JP] Japan .................. 55-160908

[51] Int. Cl.³ ............................................. G06F 15/42
[52] U.S. Cl. ................................... 364/414; 378/901
[58] Field of Search ................ 364/414, 571; 378/901, 378/19, 20; 358/111; 382/6, 54

[56] References Cited

U.S. PATENT DOCUMENTS 4,042,811  8/1977  Brunnett et al. ............... 364/414
4,274,140  6/1981  Watson ........................... 364/414
4,379,329  4/1983  Lemay ............................ 364/414

OTHER PUBLICATIONS

IEEE Transactions on Computers, vol. C-29, No. 5, May 108, New York, E. E. Swartzlander et al.: "Arithmetic for Ultra-high-speed Tomography": pp. 341-353.

*Primary Examiner*—Errol A. Krass
*Attorney, Agent, or Firm*—Cushman, Darby & Cushman

[57] ABSTRACT

A data processing device applied to a computed tomography system which examines a living body utilizing radiation of X-rays is disclosed. The X-rays which have penetrated the living body are converted into electric signals in a detecting section. The electric signals are acquired and converted from an analog form into a digital form in a data acquisition section, and then supplied to a matrix data-generating section included in the data processing device. By this matrix data-generating section are generated matrix data which correspond to a plurality of projection data. These matrix data are supplied to a partial sum-producing section. The partial sums respectively corresponding to groups of the matrix data are calculated in this partial sum-producing section and then supplied to an accumulation section. In this accumulation section, the final value corresponding to the total sum of the matrix data is calculated, whereby the calculation for image reconstruction is performed.

15 Claims, 6 Drawing Figures

FIG. 6

| TIME | 1ST PARTIAL SUM CALCULATING UNIT | | 2ND PARTIAL SUM CALCULATING UNIT | | 3RD PARTIAL SUM CALCULATING UNIT | | 4TH PARTIAL SUM CALCULATING UNIT | |
|---|---|---|---|---|---|---|---|---|
| | ROW NO. | PROJECTION NO. | ROW NO. | PROJECTION NO. | ROW NO. | PROJECTION NO. | ROW NO. | PROJECTION NO. |
| 1 | 1 | | | | | | | |
| 2 | " | 2 | 2 | | | | | |
| 3 | " | 3 | " | " | 3 | | | |
| 4 | " | ④ | " | ④ | " | | 4 | |
| 5 | 5 | 1 | " | 1 | " | 1 | " | 1 |
| 6 | " | 2 | 6 | 2 | " | 2 | " | 2 |
| 7 | " | 3 | " | 3 | 7 | 3 | " | 3 |
| 8 | " | ④ | " | ④ | " | ④ | 8 | ④ |
| 9 | 9 | 1 | " | 1 | " | 1 | " | 1 |
| --- | --- | --- | --- | --- | --- | --- | --- | 2 |
| 313 | 313 | 1 | " | | " | | " | |
| 314 | " | 2 | 314 | 1 | " | | " | |
| 315 | " | 3 | " | 2 | 315 | 1 | " | |
| 316 | " | ④ | " | 3 | " | 2 | 316 | 1 |
| 317 | 317 | 1 | " | ④ | " | 3 | " | 2 |
| 318 | " | 2 | 318 | 1 | " | ④ | " | 3 |
| 319 | " | 3 | " | 2 | 319 | 1 | " | ④ |
| 320 | " | ④ | " | 3 | " | 2 | 320 | 1 |
| 321 | | | " | ④ | " | 3 | " | 2 |
| 322 | | | | | " | ④ | " | 3 |
| 323 | | | | | | | " | ④ |

DATA PROCESSING DEVICE FOR COMPUTED TOMOGRAPHY SYSTEM

BACKGROUND OF THE INVENTION

The present invention relates to a data processing device which is applied to a computed tomography system and calculates and processes projection data for image reconstruction and, more particularly, to a data processing device which calculates and processes projection data for image reconstruction according to a back-projection technique to convert the data into data for two-dimensional slice images.

Images obtained in a computed tomography scanning system (hereinafter referred to simply as "the CT system") are not converted into forms which we can understand (that is, visual images) until calculation and processing for image reconstruction are performed. In this sense, an image reconstruction device plays an extremely important role in the CT system. In general, the CT system consists of three subsystem: 1. a data acquisition subsystem, 2. an image reconstruction subsystem and 3. an image display and evaluation subsystem. In this image reconstruction, the projection data are obtained from detectors which rotate corresponding to the rotation of an X-ray source (so-called ROTATE/ROTATE system) and are disposed in opposition to this X-ray source with an object to be examined being interposed therebetween. The projection data are processed by a computer and converted into so-called CT numbers. The data for tomograms are formed from these CT numbers. The back-projection technique is one of the algorithms used for image reconstruction. The principle of the back-projection operation for getting the original image or picture is disclosed in U.S. Pat. No. 4,219,876 of Mizutani et al (Aug. 26, 1980), from line 9 to line 68 of the fifth column. In other words, the back-projection calculation is composed of a repetition of basic accumulation. The numbers of projection data and of display picture elements (hereinafter referred to as "pixel") have lately tended to increase to enable reconstruction of more precise images. Therefore, the amount of calculation executed by the data processing device for reconstruction processing has been still further increased. However, the scanning time in the data acquisition subsystem has been reduced to several seconds. Thus, it becomes necessary to correspondingly shorten the time for image reconstruction from the viewpoint of improvement in cost/performance of the CT system. Consequently, the CT system especially needs a data processing device which not only has a large calculating capacity, but also calculates at a high speed.

In a data processing device applied to a conventional CT system, matrix data consisting of 320 columns×320 rows, for example, are sequentially accumulated for every projection (for example, 600 projections as a whole) and stored in a memory (image memory). Then, the image reconstruction is performed according to the back-projection technique mentioned above. However, since the projection data are sequentially accumulated and processed for each of the 600 projections in the conventional data processing device, at least 600 memory accesses must be made for each row. The greater the number of memory accesses, the longer becomes the total access time, unless each memory access is speeded up. On the other hand, there is a predetermined limit to the access speed in the image memory. For the reasons described above, such a data processing device is defective in that the speedup of data processing is prevented.

In order to overcome this defect, it may be possible to employ a back-projection data generating section of the data processing device as a multiplex system and to simultaneously read out (interleave) a plurality of words stored in the image memory so that the speedup of data processing is realized. However, when the interleaving reaches or exceeds a certain limit, it becomes difficult to effectively use the image memory with regard to its capacity, which raises a problem of economy. A 16-bit IC memory is now generally considered to be economical as a single unit. However, when the image memory formed of 16-bit IC memory is multiplexed and interleaving above some limit is executed as described above, the area of the IC memory situated in the direction of the column becomes unavailable, and this produces much waste. In addition, the economic loss is increased, since the number of IC memories used is increased.

SUMMARY OF THE INVENTION

The present invention has for its object to provide a data processing device of a computer applicable to a CT system, which can improve the accumulation speed and thereby still further speed up the data processing, with reducing the economy of the device.

The data processing device of the present invention is applied to a computed tomography system which examines at least one portion of a living body utilizing radiation of X-rays or the like, and processes data from a plurality of projections. This data processing device comprises a first processing means for receiving electrical tomography signals corresponding to radiation which has penetrated the living body to sequentially generate N matrix data on the basis of these signals. Each matrix of data has i columns and j rows. It is to be noted that the letters N, i and j indicate positive integers (that is, natural numbers). The data processing device further comprises a second processing means for substantially dividing the N matrix data into k data groups with n of the N matrix data being defined as one unit group, and for respectively calculating the partial sums of these k data groups; and a third processing means connected to the second processing means for sequentially accumulating the partial sum data of the k data groups to calculate the total sum of the N matrix data mentioned above. Similarly, it is assumed that the letters n and k indicate natural numbers and satisfy the conditions: $n<N$ and $k=N/n$.

BRIEF DESCRIPTION OF THE DRAWINGS

FIG. 6 shows a timing chart for explaining the operation mode of the data processing device of FIG. 1.

DETAILED DESCRIPTION OF THE PREFERRED EMBODIMENT

Figure 1:
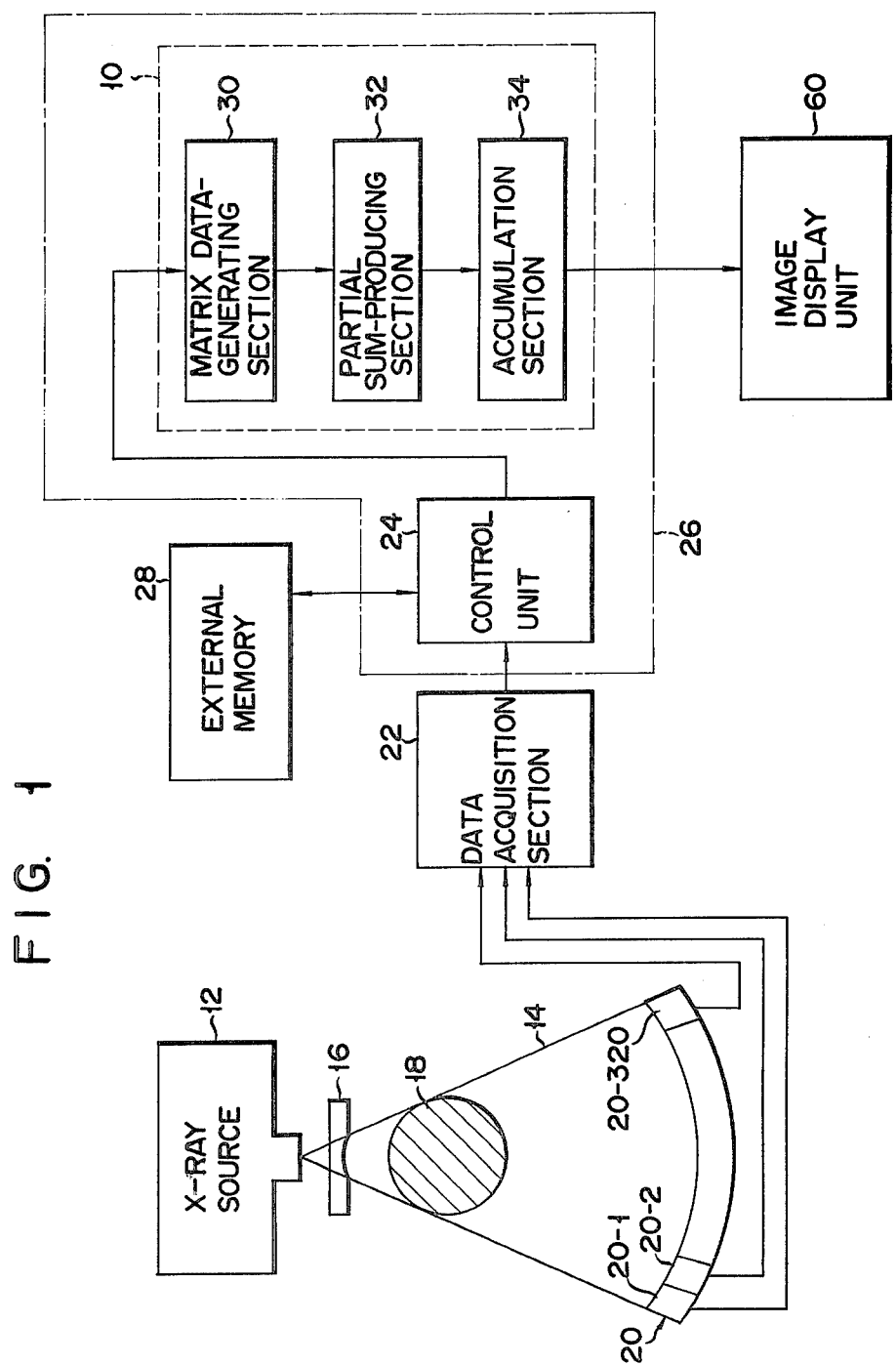
FIG. 1 schematically shows the overall construction of a CT system including a data processing device according to one embodiment of the present invention.

The overall construction of a CT system including a data processing device 10 according to an embodiment of the present invention is shown in FIG. 1. An X-ray source 12 incorporates, for example, a known X-ray controller, a high-voltage generator, a high speed starter, an X-ray tube and so on, none of which is shown. From this X-ray source 12 is produced a pulsating X-ray beam 14 under the conditions that the tube voltage is 120 kV and the tube current is 30 mA, for example. The fan-shaped X-ray beam 14 generated by the X-ray source 12 penetrates a wedge filter 16 and a subject 18 such as a human body (region of interest, ROI) and reaches an X-ray detecting section 20. This X-ray detecting section 20 serves to produce electric signals accurately corresponding to the intensity characteristic of the X-ray dose which has penetrated the subject 18. The detecting section 20 is comprised of a plurality of delector elements, for example 320, detector elements 20-1, 20-2, ..., 20-320 which are arranged along an arc line of predetermined radius. In each of these detector elements 20-1, 20-2, ..., 20-320 is charged high pressure Xenon (Xe) gas. Electrons produced by ionization caused by the X-rays incident on the respective elements are collected in an electrode, not shown. An electric signal which is substantially proportional to the energy of the incident X-ray is output from each detector element.

Figure 2:
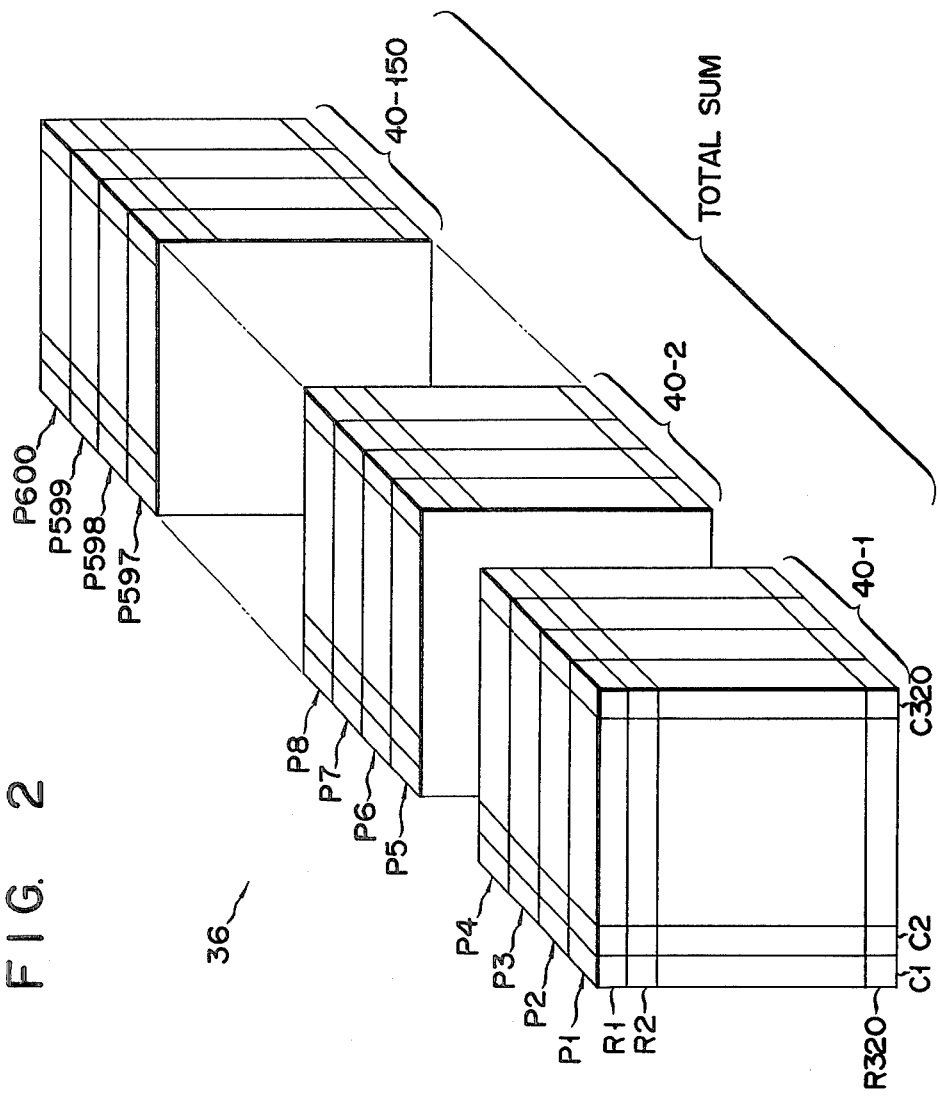
FIG. 2 shows a simulated view of projection data which are divided into a plurality of blocks according to the present invention.

The electric signals (analog signals) output from the X-ray detecting section 20 are transmitted to a data acquisition section 22. This data acquisition section 22 is also comprised of a plurality of channels whose number is equal to that of the detector elements constituting the X-ray detecting section 20, that is, 320. This data acquisition section 22 serves to convert the analog electric signals into digital signals. The data acquisition section 22 includes, for example, a known signal amplifier, a sampling and holding circuit, a multiplexer, an A/D converter and so on, none of which is shown. The digital signals (matrix data) output from the data acquisition section 22 are transferred through a control unit 24 provided in an image reconstruction device 26, and temporarily stored in an external memory 28. After being read out from this external memory 28 at a predetermined time, these matrix data are input to the data processing device 10 of the present invention in a known manner. The data processing device 10 includes a matrix data-generating section 30, a partial sum-producing section 32 and an accumulation section 34. As shown in FIG. 2, the matrix data which correspond to 600 projections P1, P2, ..., P600, for example, form one data aggregate 36 as a whole. Each projection corresponds to matrix data collected into a matrix consisting of 320 columns×320 rows. The data processing device 10 divides the aggregate 36 of matrix data into a plurality of groups, each of which is defined to contain four projections as one unit, for example. It then calculates a partial sum for each divided data group 40-1, 40-2, ..., 40-150. The calculation for image reconstruction is performed according to the back-projection technique by sequentially accumulating these partial sums to obtain the total sum.

Figure 3:
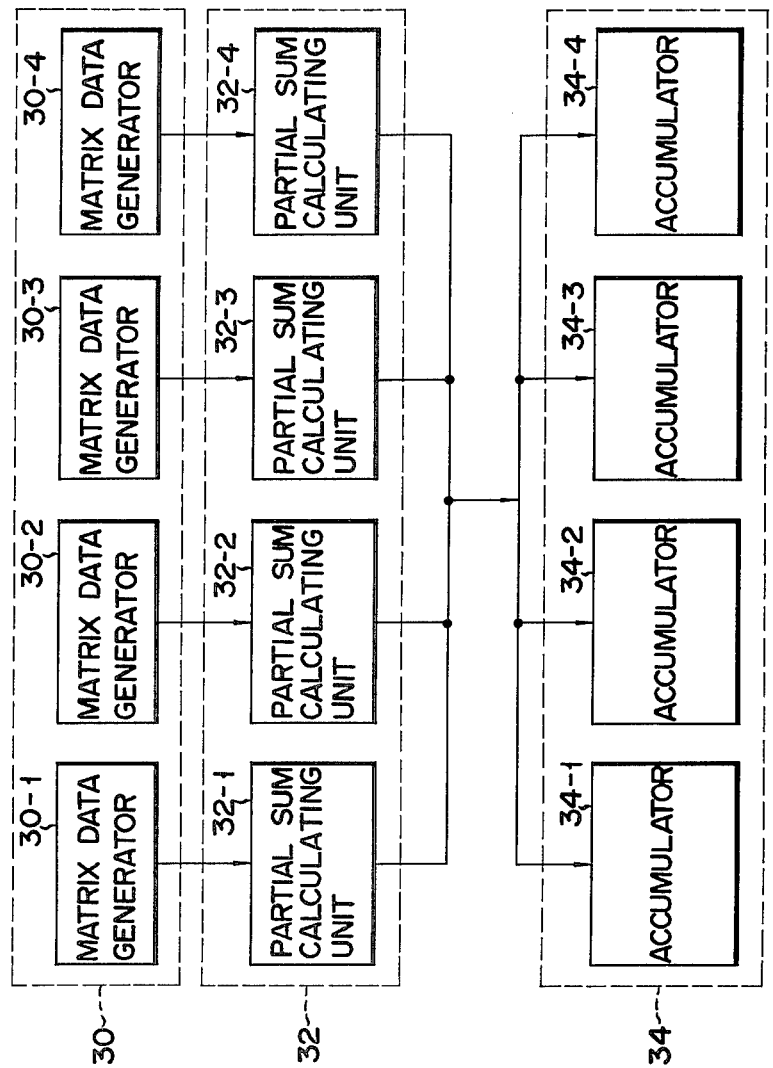
FIG. 3 shows the internal construction of the data processing device of FIG. 1.

In FIG. 3, the internal construction of the data processing device 10 of the image reconstruction device 26 shown in FIG. 1 is illustrated. In this data processing device 10, one data group which is shown in FIG. 2 and corresponds to four projections is processed in the partial sum-producing section 32 as multiplexed fourfold. The matrix data-generating section 30 includes four (first to fourth) matrix data generators 30-1, 30-2, 30-3 and 30-4 which are connected in parallel with each other. The data of four projections forming one block are acquired in the matrix data-generators 30-1, 30-2, 30-3 and 30-4. These data generators 30-1, 30-2, 30-3 and 30-4 are respectively connected to four (first to fourth) partial sum-calculating units 32-1, 32-2, 32-3 and 32-4 which constitute the partial sum-producing section 32 and are connected in parallel with each other. The data stored in each matrix data generator are sequentially input to these four calculating units 32-1, 32-2, 32-3 and 32-4. The output ends of the partial sum-calculating units 32-1, 32-2, 32-3 and 32-4 are connected to the accumulation section 34 described above. This accumulation section 34 is composed of four (first to fourth) accumulators 34-1, 34-2, 34-3 and 34-4. The data stored in the partial sum-calculating units 32-1, 32-2, 32-3 and 32-4 are respectively sequentially input to these four accumulators.

Figure 4:
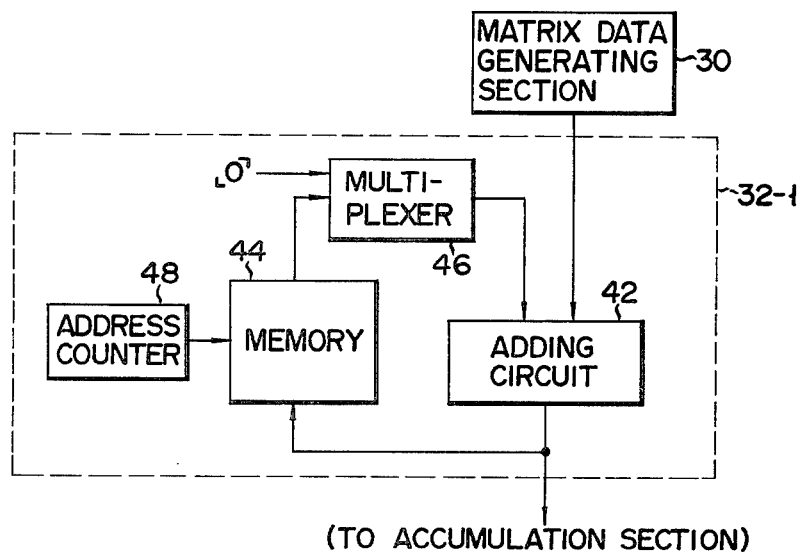
FIG. 4 shows the internal construction of a partial sum-calculating unit included in a partial sum-producing section provided in the data processing device of FIG. 3.

FIG. 4 shows the construction of any one of the four partial sum-calculating units 32-1, 32-2, 32-3 and 32-4 constituting the partial sum-producing section 32, for example, that of the calculating unit 32-1. The other calculating units have the same construction as this calculating unit 32-1. An output from the matrix data-generating section 30 is transmitted to one input end of an adding circuit 42. The output of this adding circuit 42 is transmitted to the accumulation section 34 (FIG. 3) and also to a multiplexer 46 through a partial sum memory 44. When the first projection is processed, the multiplexer 46 outputs a zero level signal which is transmitted to the other input end of the adding circuit 42. When the subsequent projections are processed, the data stored in the partial sum memory 44 are output from the multiplexer 46. These data are input to the other input end of the adding circuit 42 as matrix data. The adding circuit 42 adds and processes the output data from the matrix data-generating section 30 and the output data from the multiplexer 46. In addition, a known address counter 48 is connected to the partial sum memory 44. To this counter 48 are supplied in a known manner clock signals, reset signals and so on, which are not shown.

Figure 5:
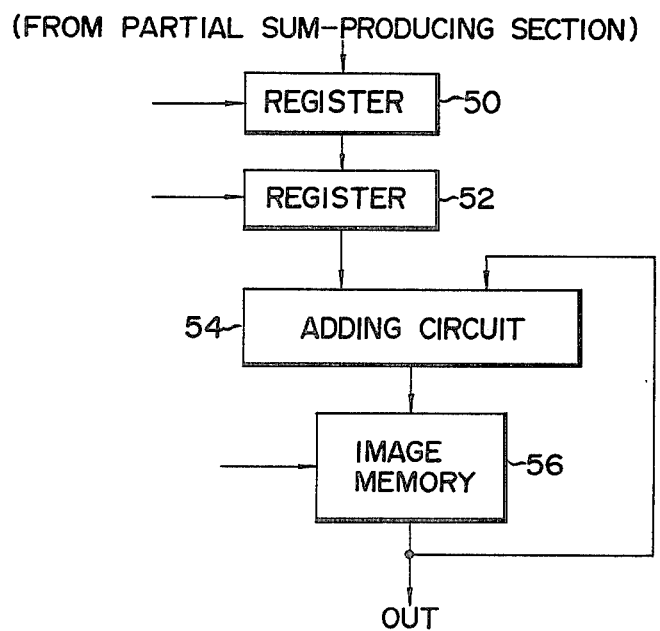
FIG. 5 shows the internal construction of an accumulator included in an accumulation section shown in FIG. 3.

FIG. 5 shows the construction of any one of the four accumulators 34-1, 34-2, 34-3 and 34-4 constituting the accumulation section 34 shown in FIG. 2, for example, that of the accumulator 34-1. The remaining accumulators have the same construction as this accumulator 34-1. The output from the partial sum-producing section 32 is fed to one input end of an adding circuit 54 through a register 50 of a first stage and a register 52 of a second stage. The output from this adding circuit 54 is supplied to an image memory 56 and stored therein. The output data of the image memory 56 are transmitted to an image display device 60 (FIG. 1) or the like shown in FIG. 1, and are also transmitted to the other input end of the adding circuit 54.

When first column data R1 of the first to fourth projections P1, P2, P3 and P4 included in the first divided data group 40-1 (FIG. 2) are processed in one of the four calculating units included in the partial sum-producing section 32, for example, in the first partial sum-calculating unit 32-1, second column data R2 of the first to fourth projections P1, P2, P3 and P4 are processed in the second partial sum-calculating unit 32-2 according to a timing which is delayed by one unit time interval. During these processing operations, the third partial sum-calculating unit 32-3 processes the third column data R3 of the first to fourth projections P1, P2, P3 and P4 contained in the first divided data group 40-1 according to a timing which is further delayed by one more unit time interval. Similarly, the data in fourth column R4 are processed during this period of time in the fourth partial sum-calculating unit 32-4 according to a timing which is still further delayed by another unit time interval. In order to explain this in detail, suppose that the first column data R1 are sequentially processed in the first partial sum-calculating unit 32-1 according to the order of arrangement of the first to fourth projections: P1→P2→P3→P4. Then, the second column data R2 are processed in the second partial sum-calculating unit 32-2 in the sequence that is shifted by one projection relative to the processing sequence of the first column data R1 described above, for example, in the sequence of projections P2→P3→P4→P1. During the same period of time, third column data R3 are processed in the third partial sum-calculating unit 32-3 in the sequence of projections P3→P4→P1→P2, and fourth column data R4 are processed in the fourth partial sum-calculating unit 34-4 according to the sequence of projections P4→P1→P2→P3. The data corresponding to four projections contained in each column are sequentially transmitted to the first to fourth accumulators 34-1, 34-2, 34-3 and 34-4 each time they are processed. The accumulation section 34 shown in FIG. 3 is composed of a parallel connection of the first to fourth accumulators. However, four accumulators need not be used, and only one accumulator may constitute the accumulation section 34, if the memory accesses of the adding circuit 54 provided in each accumulator are speeded up.

The operation mode of the data processing device 10 of the construction according to one embodiment of the present invention will be explained below with reference to the timing chart shown in FIG. 6. The timing chart of FIG. 6 shows the operation timings of the first to fourth partial sum-calculating units 32-1, 32-2, 32-3 and 32-4 constituting the partial sum-producing section 32 shown in FIG. 3. In FIG. 6, the symbol " is used to mean "the same as above." The analog signal which is output from the X-ray detecting section 20 included in the CT system of FIG. 1 is acquired in the data acquisition section 22 and converted into digital signals (matrix data). These matrix data are supplied through the control unit 24 to the external memory 28 to be stored therein, and are also transmitted through the control unit 24 to the data processing device 10 of the present invention. In this data processing device 10, the first column data R1 of the first to fourth projections P1, P2, P3 and P4 (FIG. 2) are sequentially added and processed in the first partial sum-calculating unit 32-1. The result of this addition output from the first partial sum-calculating unit 32-1 is stored in the partial sum memory 44. During this period of time, the second column data R2 of the first to fourth projections P1, P2, P3 and P4 are sequentially added in the second partial sum-calculating unit 32-2 according to a timing which is delayed by one unit time interval, and thereafter the result is stored in a partial sum memory provided in the partial sum-calculating unit 32-2. At this time, the third column data R3 of these projections are added in the third partial sum-calculating unit 32-3 at a timing which is further delayed by one unit time interval. The result of this addition is stored in a partial sum memory provided in the unit 32-3. Simultaneously, the fourth column data R4 of these projections are added in the fourth partial sum-calculating unit 32-4 according to a timing which is still further delayed by one unit time interval, and the result of the addition is stored in a partial sum memory included in the unit 32-4. The timing of operations of the fourth partial sum-calculating unit 34-4 corresponds to the time "4" in the timing chart of FIG. 6. The addition result data produced by each partial sum-calculating unit are transmitted to the accumulation section 34 after the completion of each addition, and the results are accumulated by this accumulation section 34. That is, the timings of transmission to the first to fourth accumulators 34-1, 34-2, 34-3 and 34-4 constituting the accumulation section 34 are relatively shifted by one unit time interval. The first partial sum-calculating unit 32-1 shifts to the next step of adding and processing fifth column data R5 (FIG. 2) of the projections P1, P2, P3 and P4, after completion of addition of the first column data of the first to fourth projections P1, P2, P3 and P4. Likewise, the second, third and fourth partial sum-calculating units 32-2, 32-3 and 32-4 respectively shift to their next steps of adding and processing sixth column data R6, seventh column data R7 and eighth column data R8 of the same projections P1, P2, P3 and P4. Thereafter, the data of every column of the first to fourth projections P1, P2, P3 and P4 are added and processed in a similar way by the partial sum-producing section 32 including the four partial sum-calculating units described above. In particular, 320th column data R320 are added in the fourth partial sum-calculating unit 32-4.

After the processing of all the column data of the first to fourth projections has been completed, the partial sum of the first data group 40-1 (FIG. 2) is calculated. After completion of the processing of the first group 40-1, the first to fourth partial sum-calculating units 32-1, 32-2, 32-3 and 32-4 sequentially add and process the remaining data groups 40-2, ..., 40-150 in a similar manner as described above, and output the respective partial sums thereof. By sequentially accumulating these partial sums, the final value of all the matrix data divided into 150 data groups 40-1, 40-2, ..., 40-150 can be obtained, and the image reconstruction according to the back-projection technique is performed.

As described above, in accordance with the present invention, an aggregate of matrix data corresponding to the projection data is divided into a predetermined number of groups and the partial sum of each data group is calculated. The total sum of all the projection data is obtained by sequentially accumulating these partial sums. Therefore, the number of access operations to the accumulation memory can be reduced. For example, if the number of projections is set to 600, at least 600 access operations have been required in the accumulation memory provided in a conventional data processing device. However, when 600 projections are divided into 150 data groups with one group being defined to contain four projections as in the embodiment of the present invention, the number of accesses can be reduced to about one-fourth, that is, 150. Consequently, the time spent to process the data can be shortened, as a result of which the data processing for the CT system can be speed up. Thus, the data processing device of the present invention is suitable for real time processing in the back-projection technique and is therefore extremely effective in further speeding up the steps of reconstructing tomograms.

Furthermore, according to the present invention, the number of image memories provided in the accumulation section can be reduced to the number of projections corresponding to one group (i.e. four in the embodiment described above). As a result, the construction of the data processing device can be simplified and made more economical.

Although the present invention has been shown and described with respect to a particular embodiment, nevertheless, various changes and modifications which are obvious to a person skilled in the art to which the invention pertains are deemed to lie within the spirit, scope and contemplation of the invention.

What we claim is:

1. An apparatus for reconstructing a two-dimensional image of an object lying in a plane, said apparatus comprising:
   (a) radiation source means for supplying a fan-shaped radiation to the object;
   (b) detector means, positioned opposite said radiation source means through the object so as to lie in the plane, for detecting radiation such as X-rays in the plane;
   (c) means for effecting a relative rotation between the object and said radiation source means about an axis of rotation; and (d) image reconstruction means, connected to said detector means, for performing a specific calculation for image reconstruction, said image reconstruction means comprising
   (1) first processing means for successively generating N sets of back-projection matrix data based on outputs derived from said detector means at N angles of said rotation, where N represents a positive integer not less than 2,
   (2) second processing means, connected to said first processing means, for summing successive n sets of back-projection matrix data, among N sets of back-projection matrix data, and for successively providing summed data, where n is a positive integer not less than 2,
   (3) image memory means for temporarily storing calculation result data, and
   (4) third processing means, connected to said second processing means and said memory means, for successively receiving the summed data for n times (n=N/K, where k is a positive integer not less than 2) and sequentially adding said summed data in such a manner that said third processing means repetitiously performs an arithmetic operation of adding that summed data which is currently supplied to said third processing means to that summed data which is currently stored in said memory means and replacing said summed data stored in said memory means with new summed data resulting from said addition by said third processing means, thereby finally permitting said memory means to a store a final value of said N sets of back-projection matrix data, whereby the number of write-operations of said memory means, which are required to attain said N sets of back-projection matrix data, is reduced substantially to N/n so that a back-projection time necessary for image reconstruction is reduced, accordingly.

2. An apparatus according to claim 1 wherein said first processing means comprises n sets of data generators which divide the N sets of back-projection matrix data into k groups of block data and sequentially supply the block data to said second processing means in an increasing order of the number of the block data.

3. An apparatus according to claim 2, wherein said second processing means comprises n sets of adding sections connected in parallel with each other, for respectively summing column data contained in a predetermined column of the n sets of matrix data, each of said adding sections including an adding circuit, a memory and a multiplexer.

4. An apparatus according to claim 3, wherein said adding circuit has a first input connected to one of said data generators, a second input, and an output connected to the second input through said memory and said multiplexer.

5. An apparatus according to claim 4, wherein said third processing means comprises adding circuit means connected to said second processing means and said memory means, for permitting said memory means to temporarily store that block data which is supplied to said third processing means and corresponds to a partial sum of said n sets of back-projection matrix data, accessing said memory means to read out said stored block data when successive block data is supplied from said second processing means, adding said successive block data to said previously stored block data and permitting said memory means to store new data resulting from said addition by said adding circuit means in place of said previously stored block data.

6. An apparatus according to claim 5, wherein said adding circuit means includes n sets of accumulators each of which includes an adding circuit and an image memory serving as said memory means.

7. An apparatus as in claim 3 wherein said first adding section sums column 1 and successively columns $(1+n)(1+2n)(1+3n) \ldots (1+x-n)$ where x is the number of rows in the matrix, said second adding section sums column 2 and successively columns $(2+n)(2+2n)(2+3n) \ldots (2+x-n)$ and said n adding section sums column $(n)(2n)(3n) \ldots (x)$.

8. Apparatus as in claim 7 wherein each said adding section carries out summing of a column in a time t such that (1) during times, t, 2t, 3t . . . nt said first adding section sums said first column, during times $(n+1)t$, $(n+2)t$, $(n+3)t \ldots 2nt$ sums said $n+1$ column . . . and during said times $(x-3)t$, $(x-2)t$, $(x-1)t$ and xt sums said $x-3$ column (2) during times 2t, 3t, . . . $(n+1)t$ said second adding section sums said first column, during times $(n+2)t$, $(n+2)t \ldots (2n+1)$ said second adding section sums said $n+2$ column . . . and during said times $(x-2)t$, $(x-1)t \ldots (x+1)t$ sums said $x-2$ column and . . . (3) during times nt, $(n+1)t$, $(n+2)t \ldots (2n-1)t$ said n adding section sums said n column, during times 2n, $(2n+1t)$, $(2n+2)t \ldots (3n-1)t$ said n adding section sums said 2n column and during times $(x-n)t$, $(x+1-n)t$, $(x+2-n)t \ldots (x-1+n)$ t sums said $(x-n)$, $(x+1-n)$, $(x+2-n) \ldots (x)$ column.

9. An apparatus according to claim 2, wherein said first processing means includes i−th block data generating means for providing $(n \cdot l+i)$−th block data, where l is a positive integer and i is a positive integer smaller than n.

10. An apparatus according to claim 2, wherein said second processing means comprises n sets of block data summing sections, respectively connected to said n data generators, for summing block data summing sections including an adding circuit, a memory and a multiplexer, said adding circuit having a first input connected to one corresponding data generator, a second input, and an output fed back to the second input through said memory and said multiplexer.

11. An apparatus according to claim 10, wherein said second processing means comprises $i$—th block data summing unit which sums $(n \cdot l + i)$—th block data included in the first to $n$—th back-projection matrix data to supply $(n \cdot l + i)$—th summed data to said third processing means where $l$ is a positive integer and $i$ is a positive integer smaller than $n$.

12. An apparatus according to claim 11, wherein each set of said block data includes a given column of a plurality of sets of back-projection data.

13. An apparatus according to claim 11, wherein said $i$—th data generating means supplies $(n \cdot l + i)$—th block data of $i$—th back-projection matrix data to said $i$—th block data summing unit in $(n \cdot l + i)$—th processing stage, and wherein said $i$—th block data summing means sum $(n \cdot l + 1)$—th block data included in the first to $n$—th back-projection matrix data to supply $(n \cdot l + i)$—th summed data to said third processing means in a $[n \cdot (l+j) + i]$—th processing stage, where $j$ represents an integer not larger than $n$.

14. An apparatus for reconstructing a two-dimensional image created by radiation of a fan-shaped beam irradiated from a plurality of angles in an object to be examined and through said object onto detector elements adjacent to each other at which a multiplicity of signals are received at said plurality of angles, said apparatus comprising:
   first processing means for generating back-projection data based on the signals received by the detector elements at said angles;
   second processing means for summing a set of successive back-projection data provided from said first processing means and for generating a summed data of the set of successive back-projection data;
   image memory means having a plurality of memory locations corresponding to said image, for storing values representative of said image;
   third processing means for adding the summed data provided from said second processing means to that value which results from previously summed data and is stored in said image memory means and for storing the added data in place of the value of said previously summed data for back-projection.

15. An apparatus according to claim 14, wherein said first processing means includes a plurality of block data generating means for successively generating block data divided from said set of successive back-projection data, said block data corresponding to divided locations of said image memory means to be back-projected, and said second means includes a plurality of block data summing means, respectively connected to said block data generating means, for summing said block data of the set of successive back-projection data to generate a summed block data to be stored in said divided locations.

* * * * *